United States Patent
Kato

(10) Patent No.: US 12,377,849 B2
(45) Date of Patent: Aug. 5, 2025

(54) VEHICLE CONTROL APPARATUS

(71) Applicant: Honda Motor Co., Ltd., Tokyo (JP)

(72) Inventor: Daichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 18/124,498

(22) Filed: Mar. 21, 2023

(65) Prior Publication Data

US 2023/0311890 A1    Oct. 5, 2023

(30) Foreign Application Priority Data

Mar. 29, 2022 (JP) ................. 2022-052987

(51) Int. Cl.
*B60W 30/18* (2012.01)
*B60W 60/00* (2020.01)

(52) U.S. Cl.
CPC .... *B60W 30/18163* (2013.01); *B60W 60/005* (2020.02); *B60W 2540/215* (2020.02); *B60W 2552/05* (2020.02); *B60W 2552/10* (2020.02); *B60W 2556/40* (2020.02)

(58) Field of Classification Search
CPC ......... B60W 30/18163; B60W 60/005; B60W 2540/215; B60W 2552/05; B60W 2552/10; B60W 2556/40; B60W 50/10; B60W 2050/143; B60W 2050/146; B60W 50/14; B60W 60/001; B60W 50/08; B60W 2556/35

See application file for complete search history.

(56) References Cited

U.S. PATENT DOCUMENTS

| 2012/0123672 | A1* | 5/2012 | Kojima | ............. | G01C 21/3658 |
| | | | | | 701/410 |
| 2013/0103304 | A1 | 4/2013 | Nishibashi et al. | | |
| 2017/0018189 | A1* | 1/2017 | Ishikawa | .............. | G05D 1/0088 |
| 2017/0082452 | A1* | 3/2017 | Sumizawa | .......... | B60W 60/001 |
| 2017/0248959 | A1* | 8/2017 | Matsubara | ...... | B60W 30/18163 |

(Continued)

FOREIGN PATENT DOCUMENTS

| JP | 5709868 B | 1/2012 |
| JP | 2015161518 A | 9/2015 |

(Continued)

OTHER PUBLICATIONS

Japanese Office action; Application 2022-052987; Sep. 12, 2023.

*Primary Examiner* — Jelani A Smith
*Assistant Examiner* — Alyssa Rorie
(74) *Attorney, Agent, or Firm* — Duft & Bornsen, PC

(57) ABSTRACT

A vehicle control apparatus includes a microprocessor configured to perform: generating an action plan so that the subject vehicle moves from the first lane to the second lane according to a mode of the lane change when it is determined that the lane change is necessary. The target route includes a branching road in which the second lane is adjacent to the first lane from a first point to a second point ahead of the first point in a traveling direction and the second lane is separated from the first lane behind the second point. The deciding including deciding, based on a length from the first point to the second point, the mode of the lane change to be a first mode or a second mode having a different reference position for determining a start position of control of the lane change each other.

13 Claims, 5 Drawing Sheets

(56) References Cited

U.S. PATENT DOCUMENTS

| | | | | |
|---|---|---|---|---|
| 2017/0320521 A1* | 11/2017 | Fujita | ................ | G01C 21/3602 |
| 2017/0323566 A1* | 11/2017 | Suto | ................ | G08G 1/096861 |
| 2020/0094838 A1* | 3/2020 | Nishimura | ........... | G05D 1/0061 |
| 2021/0155243 A1* | 5/2021 | Taniguchi | ............. | B60W 40/04 |
| 2022/0203992 A1* | 6/2022 | Taniguchi | .............. | G08G 1/167 |

FOREIGN PATENT DOCUMENTS

| | | |
|---|---|---|
| JP | 2018103767 A | 7/2018 |
| JP | 2020163927 A | 10/2020 |

* cited by examiner

VEHICLE CONTROL APPARATUS

CROSS-REFERENCE TO RELATED APPLICATION

This application is based upon and claims the benefit of priority from Japanese Patent Application No. 2022-052987 filed on Mar. 29, 2022, the content of which is incorporated herein by reference.

BACKGROUND OF THE INVENTION

Field of the Invention

This invention relates to a vehicle control apparatus configured to control traveling of a vehicle.

Description of the Related Art

As this type of device, there has been conventionally known a device that performs lane change assistance control for assisting steering so that a subject vehicle moves from a currently traveling lane to a lane adjacent to the currently traveling lane (see, for example, JP 2018-103767 A). The device described in JP 2018-103767 A starts lane change assistance control when detecting a lane change assistance request based on an operation of an indicator lever by a driver.

Meanwhile, on a road where a lane in which a subject vehicle is traveling and an adjacent lane to which the subject vehicle is to move are separated from each other at a point ahead in the traveling direction, it is necessary to complete a lane change before the point. However, when the lane change assistance control is started simply based on the lane change assistance request as in the device described in JP 2018-103767 A, there is a possibility that the lane change cannot be completed at a certain position at which the lane change assistance request is detected.

SUMMARY OF THE INVENTION

An aspect of the present invention is a vehicle control apparatus including: a microprocessor and a memory coupled to the microprocessor. The microprocessor is configured to perform: acquiring a target route of a subject vehicle traveling in a self-drive mode from map information based on a current position and a destination of the subject vehicle; determining based on the target route whether a lane change is necessary to change a traveling lane of the subject vehicle from a first lane in which the subject vehicle is currently traveling to a second lane; deciding a mode of the lane change; and generating an action plan so that the subject vehicle moves from the first lane to the second lane according to the mode of the lane change decided in the deciding when it is determined that the lane change is necessary in the determining. The target route includes a branching road in which the second lane is adjacent to the first lane from a first point to a second point ahead of the first point in a traveling direction and the second lane is separated from the first lane behind the second point. The microprocessor is configured to perform the deciding including deciding, based on a length of a section from the first point to the second point, the mode of the lane change to be a first mode or a second mode having a different reference position for determining a start position of control of the lane change each other.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 4. A vehicle control apparatus according to the embodiment of the present invention can be applied to a vehicle having a self-driving capability, that is, a self-driving vehicle. A vehicle to which the vehicle control apparatus according to the present embodiment is applied may be referred to as a subject vehicle to be distinguished from other vehicles. The subject vehicle may be any of an engine vehicle having an internal combustion (engine) as a traveling drive source, an electric vehicle having a traveling motor as a traveling drive source, and a hybrid vehicle having an engine and a traveling motor as traveling drive sources. The subject vehicle can travel not only in a self-drive mode in which driving operation by a driver is unnecessary, but also in a manual drive mode with driving operation by the driver.

Figure 1:
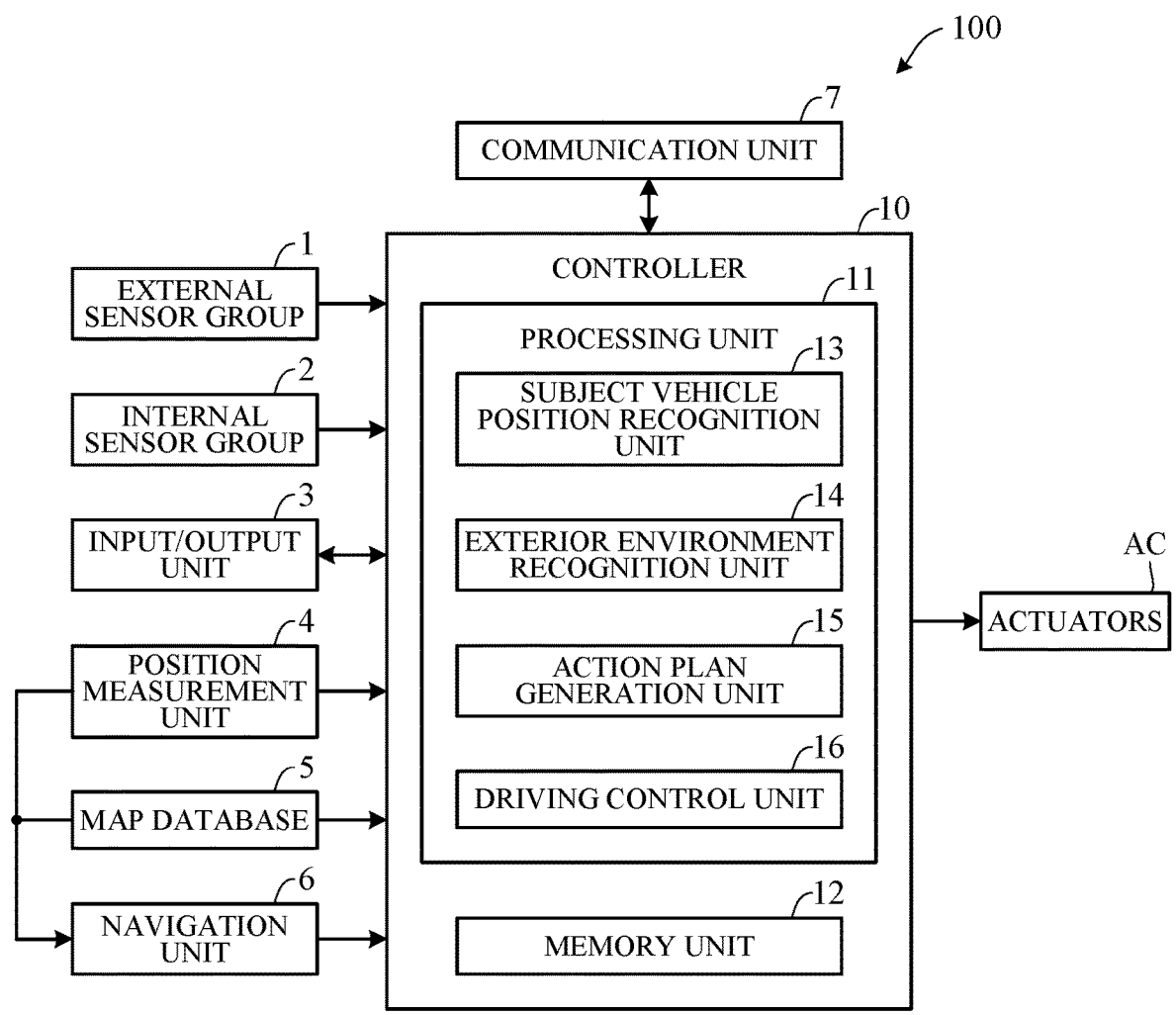
FIG. 1 is a block diagram schematically illustrating an overall configuration of a vehicle control system including a vehicle control apparatus according to the embodiment of the present invention.

FIG. 1 is a block diagram schematically illustrating an overall configuration of a vehicle control system 100 including a vehicle control apparatus according to the embodiment of the present invention. As illustrated in FIG. 1, the vehicle control system 100 mainly includes a controller 10, and an external sensor group 1, an internal sensor group 2, an input/output device 3, a position measurement unit 4, a map database 5, a navigation unit 6, a communication unit 7, and actuators AC each communicably connected to the controller 10 via a CAN communication line or the like.

The external sensor group 1 is a generic term for a plurality of sensors (external sensors) that detect an external situation which is peripheral information of the subject vehicle. For example, the external sensor group 1 includes a LiDAR that detects a position (a distance or a direction from the subject vehicle) of an object around the subject vehicle by irradiating laser light and detecting reflected light, a radar that detects a position of an object around the subject vehicle by irradiating electromagnetic waves and detecting reflected waves, and a camera that has an imaging element such as a CCD or a CMOS and captures an image around the subject vehicle (forward, rearward, and sideward directions).

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects an acceleration in front-rear and left-right directions of the subject vehicle, a rotation speed sensor that detects a rotation speed of the traveling drive source, and the like. The internal sensor group 2 further includes a sensor that detects driver's driving operation in a manual drive mode, for example, operation of an accelerator pedal, operation of a brake pedal, operation of a steering wheel, and the like.

The input/output device 3 is a generic term for devices to which a command is input from a driver or from which information is output to the driver. For example, the input/output device 3 includes various switches to which the driver inputs various commands by operating operation members (including switches, buttons, and the like provided on the steering wheel), a microphone to which the driver inputs a command by voice, a display that provides information to the driver via a display image, a speaker that provides information to the driver by voice, and the like. The display displays, for example, information for prompting the driver to operate the steering wheel (hands-on) and information for pre-noticing and notifying switching to the manual drive mode.

The position measurement unit (GNSS unit) 4 includes a position measurement sensor that receives a position measurement signal transmitted from a position measurement satellite. The position measurement sensor can also be included in the internal sensor group 2. The position measurement satellite is an artificial satellite such as a global positioning system (GPS) satellite or a quasi-zenith satellite. The position measurement unit 4 measures a current position (latitude, longitude, and altitude) of the subject vehicle using position measurement information received by the position measurement sensor.

The map database 5 is a device that stores general map information used in the navigation unit 6, and is constituted by, for example, a hard disk or a semiconductor element. The map information includes road position information, information on a road shape (curvature or the like), and position information on an intersection or a branch point. The map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated based on a current position of the subject vehicle measured by the position measurement unit 4 and the map information stored in the map database 5. The current position of the subject vehicle can be measured using values detected by the external sensor group 1, and the target route may be calculated based on the current position and the highly accurate map information stored in the memory unit 12.

The communication unit 7 communicates with various servers (not illustrated) via a network including a wireless communication network represented by the Internet network, a mobile phone network, or the like, and acquires map information, travel history information, traffic information, and the like from the servers periodically or at a certain timing. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated. It is also possible to communicate with other vehicles via the communication unit 7.

The actuators AC are traveling actuators for controlling traveling of the subject vehicle. In a case where the traveling drive source is an engine, the actuators AC include a throttle actuator that adjusts an opening (throttle opening) of a throttle valve of the engine. In a case where the traveling drive source is a traveling motor, the traveling motor is included in the actuators AC. The actuators AC also include a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), a memory unit 12 such as a ROM or a RAM, and other peripheral circuits (not illustrated) such as an I/O interface. Although a plurality of ECUs having different functions such as an engine control ECU, a traveling motor control ECU, and a braking device ECU can be separately provided, in FIG. 1, the controller 10 is illustrated as a set of these ECUs for convenience.

The memory unit 12 stores highly accurate road map information. The road map information includes road position information, information on a road shape (curvature or the like), information on a road gradient, position information on an intersection or a branch point, information on the number of lanes, a width of a lane and position information for each lane (information on a center position of a lane or a boundary line of a lane position), position information on a landmark (a traffic light, a sign, a building, or the like) as a mark on a map, and information on a road surface profile such as unevenness of a road surface. The map information stored in the memory unit 12 includes map information acquired from the outside of the subject vehicle via the communication unit 7 and map information created by the subject vehicle itself using values detected by the external sensor group 1 or values detected by the external sensor group 1 and the internal sensor group 2. The memory unit 12 also stores travel history information including values detected by the external sensor group 1 and the internal sensor group 2 in association with map information.

The processing unit 11 includes a subject vehicle position recognition unit 13, an exterior environment recognition unit 14, an action plan generation unit 15, and a driving control unit 16 as functional components.

The subject vehicle position recognition unit 13 recognizes a position of the subject vehicle (subject vehicle position) on a map, based on the position information of the subject vehicle obtained by the position measurement unit 4 and the map information of the map database 5. The subject vehicle position may be recognized using the map information stored in the memory unit 12 and the peripheral information of the subject vehicle detected by the external sensor group 1, and as a result, the subject vehicle position can be recognized with high accuracy. When the subject vehicle position can be measured by a sensor installed on a road or outside a road side, the subject vehicle position can be recognized by communicating with the sensor via the communication unit 7.

The exterior environment recognition unit 14 recognizes an external situation around the subject vehicle based on the signal from the external sensor group 1 such as a LiDAR, a radar, and a camera. For example, the position, speed, and acceleration of a surrounding vehicle (a forward vehicle or a rearward vehicle) traveling around the subject vehicle, the position of a surrounding vehicle stopped or parked around the subject vehicle, the positions and states of other objects and the like are recognized. Other objects include signs, traffic lights, markings such as division lines and stop lines of roads, buildings, guardrails, utility poles, signboards, pedestrians, bicycles, and the like. The states of other objects include a color of a traffic light (red, green, yellow), and the moving speed and direction of a pedestrian or a bicycle.

The action plan generation unit 15 generates a driving path (target path) of the subject vehicle from a current point of time to a predetermined time ahead based on, for example, the target route calculated by the navigation unit 6, the map information stored in the memory unit 12, the subject vehicle position recognized by the subject vehicle position recognition unit 13, and the external environment recognized by the exterior environment recognition unit 14. When there are a plurality of paths that are candidates for the target path on the target route, the action plan generation unit 15 selects, from among the plurality of paths, an optimal path that satisfies criteria such as compliance with laws and regulations, and efficient and safe traveling, and sets the selected path as the target path. Then, the action plan generation unit 15 generates an action plan corresponding to the generated target path. The action plan generation unit 15 generates various action plans corresponding to traveling modes, such as overtaking traveling for overtaking a preceding vehicle, lane change traveling for changing a traveling lane, following traveling for following a preceding vehicle, lane keeping traveling for keeping the lane so as not to deviate from the travel lane, deceleration traveling, acceleration traveling, or the like. When generating the target path, the action plan generation unit 15 first determines a travel mode and generates the target path based on the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining a target acceleration for each unit time calculated by the action plan generation unit 15 in consideration of travel resistance determined by a road gradient or the like in the self-drive mode. Then, for example, the actuators AC are feedback-controlled so that an actual acceleration detected by the internal sensor group 2 becomes the target acceleration. More specifically, the actuators AC are controlled so that the subject vehicle travels at the target vehicle speed and the target acceleration. When the drive mode is the manual drive mode, the driving control unit 16 controls each of the actuators AC in accordance with a travel command (steering operation or the like) from the driver, acquired by the internal sensor group 2.

Figure 2A:
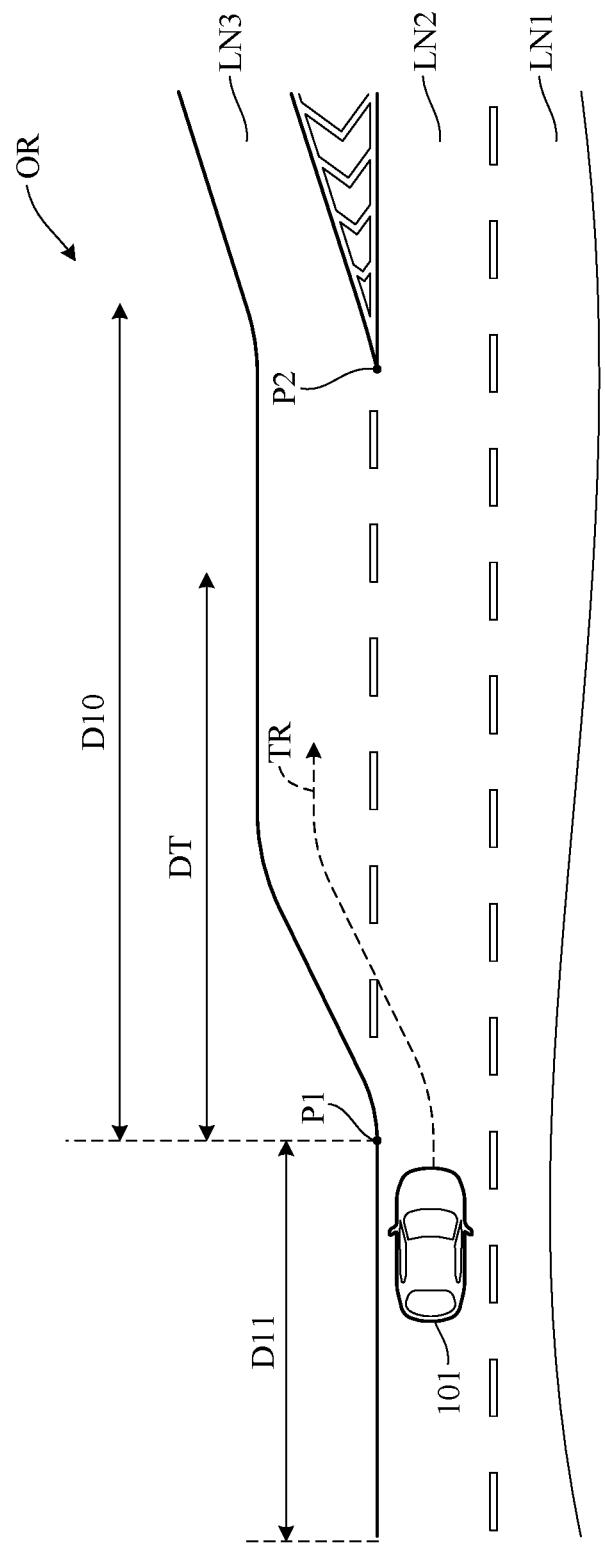
FIG. 2A is a diagram illustrating an example of a branching road.

Meanwhile, in a scene where a subject vehicle 101 travels on a branching road OR as shown in FIG. 2A in the self-drive mode, when it is determined that the subject vehicle 101 needs to move from a current lane LN2 to another lane LN3 based on the target route calculated by the navigation unit 6, the action plan generation unit 15 generates a target path so that the subject vehicle 101 completes the lane change before a branch end position (point P2). On the branching road OR, the current lane (lane LN2) branches into the current lane and the another lane (lane LN3) at a point P1, and the another lane LN3 is adjacent to the current lane LN2 from the point P1 to the point P2 ahead of the point P1 in the traveling direction. The driving control unit 16 controls the actuators AC so that the subject vehicle 101 travels on the target path. As a result, the subject vehicle 101 can automatically move to the another lane LN3.

A mode of lane change that is automatically performed (hereinafter referred to as an automatic lane change mode) includes a fully-automatic lane change mode in which the action plan generation unit 15 generates an action plan for lane change and the driving control unit 16 determines to start the lane change based on the action plan, and a semi-automatic lane change mode in which the action plan generation unit 15 generates an action plan for lane change and an occupant of the subject vehicle 101 instructs to start the lane change. Hereinafter, the semi-automatic lane change mode will be simply referred to by the automatic lane change mode.

Figure 2B:
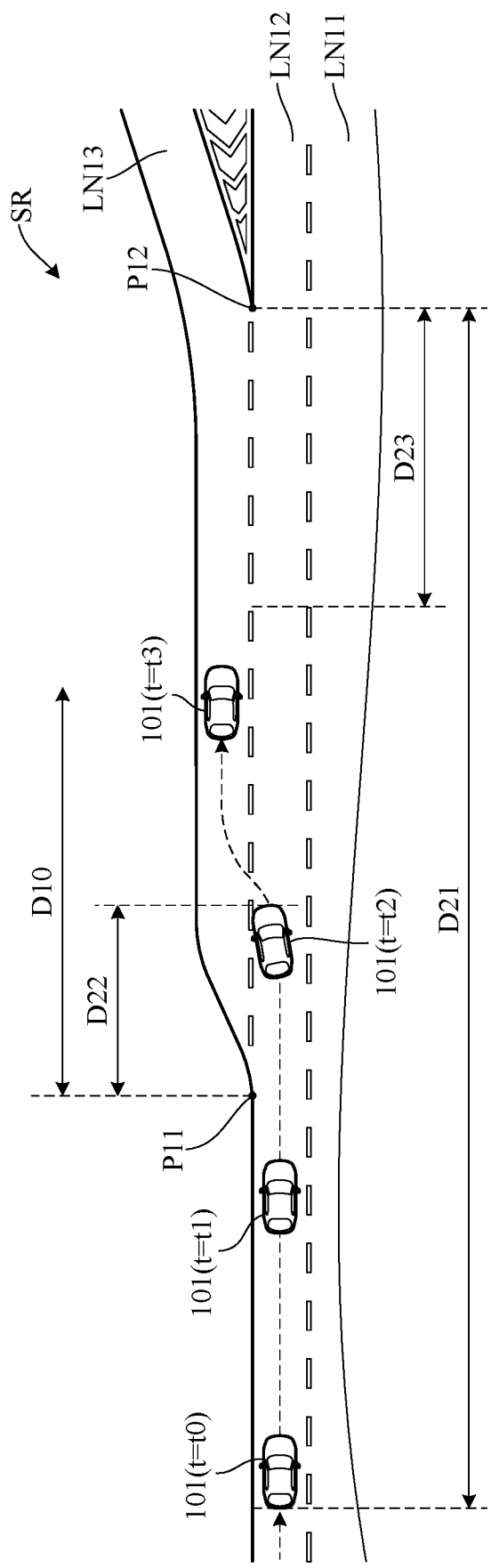
FIG. 2B is a diagram illustrating another example of the branching road.

Meanwhile, the branching road includes a branching road SR as illustrated in FIG. 2B as well as a general branching road (hereinafter referred to as the normal branching road) as illustrated in FIG. 2A. On the branching road SR, a section in which the current lane (lane LN12) and the another lane (lane LN13) are adjacent to each other (hereinafter referred to the adjacent section), that is, a section from the point P11 to the point P12, is longer than the normal branching road of FIG. 2A. As illustrated in FIG. 2B, a branching road in which a length of an adjacent section is equal to or greater than a predetermined distance D10 will be referred to as the specific branching road or the specific road.

On the normal branching road OR of FIG. 2A, when the subject vehicle 101 moves from the current lane LN2 to the another lane LN3 in the adjacent section from the point P1 to the point P2 in the automatic lane change mode, a lane change is started immediately after the subject vehicle 101 passes the point P1 in order to complete the lane change in the adjacent section. A broken line arrow TR in FIG. 2A schematically indicates a traveling trajectory of the subject vehicle 101. As described above, on the normal branching road OR, the lane change control is performed with respect to the branch start position (point P1). On the other hand, on the specific branching road SR of FIG. 2B, when the subject vehicle 101 moves from the current lane LN12 to the another lane LN13 in the adjacent section from the point P11 to the point P12 in the automatic lane change mode, since the adjacent section is sufficiently long, it is not necessary to start the lane change immediately after passing the point P1. Therefore, if the lane change control is performed on the specific branching road SR of FIG. 2B similarly to that on the normal branching road OR, there is a possibility that the occupant of the subject vehicle 101 feels uncomfortable. Therefore, in the present embodiment, in order to cope with such a problem, a vehicle control apparatus is configured as follows. In the following description, an automatic lane change mode applied to a lane change on the normal branching road will be referred to as the normal lane change mode, and an automatic lane change mode applied to a lane change on the specific branching road will be referred to as the specific lane change mode.

Figure 3:
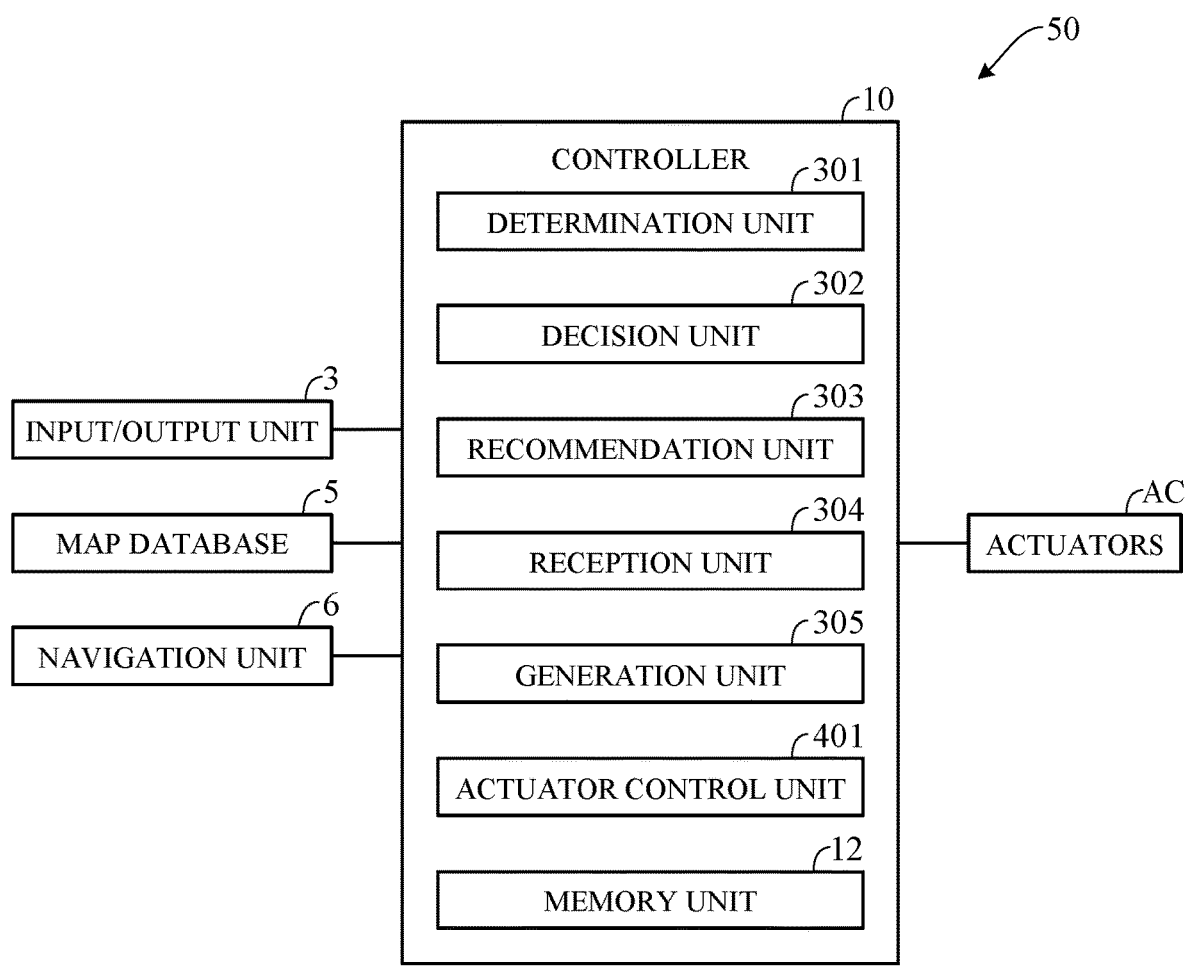
FIG. 3 is a block diagram illustrating a schematic configuration of the vehicle control apparatus according to the embodiment of the present invention.

FIG. 3 is a block diagram illustrating a schematic configuration of a vehicle control apparatus 50 according to the embodiment of the present invention, and illustrates a configuration when the subject vehicle 101 mainly travels in a self-drive mode. The vehicle control apparatus 50 is included in the vehicle control system 100 of FIG. 1. As illustrated in FIG. 3, the vehicle control apparatus 50 includes an input/output device 3, a map database 5, a navigation unit 6, and a controller 10.

The controller 10 of FIG. 3 includes a determination unit 301, a decision unit 302, a recommendation unit 303, a reception unit 304, a generation unit 305, an actuator control unit 401, and a memory unit 12 as functional components.

The determination unit 301, the decision unit 302, the recommendation unit 303, the reception unit 304, and the generation unit 305 constitute a part of the action plan generation unit 15 in FIG. 1, and the actuator control unit 401 constitutes a part of the driving control unit 16.

The determination unit 301 acquires a target route of the subject vehicle 101 from the map information. More specifically, the determination unit 301 acquires a target route calculated by the navigation unit 6 based on a current position and a destination of the subject vehicle 101. The determination unit 301 determines whether the acquired target route includes a branching road and whether the subject vehicle 101 needs to change a lane on the branching road.

When the determination unit 301 determines that a lane change on the branching road is necessary, the decision unit 302 determines a mode of lane change. When the length of the adjacent section on the branching road is equal to or greater than a predetermined threshold value DT (<the predetermined distance D10), the decision unit 302 decides the mode of lane change to be the automatic lane change mode. Further, when the length of the adjacent section on the branching road is equal to or greater than the predetermined distance D10, that is, when the branching road is a specific branching road, the decision unit 302 decides the mode of lane change to be the specific lane change mode. On the other hand, when the length of the adjacent section is smaller than the predetermined distance D10, that is, when the branching road is a normal branching road, the decision unit 302 decides the mode of lane change to be the normal lane change mode.

When the length of the adjacent section is smaller than the predetermined threshold value DT, the decision unit 302 determines the mode of lane change to be the manual lane change mode in which a lane change is manually performed according to a driving operation of the occupant of the subject vehicle 101. Specifically, the decision unit 302 determines that it is not possible to automatically change a lane, and outputs to the input/output device 3 screen information and audio information for requesting the occupant of the subject vehicle 101 to put his/her hands on the steering wheel, such that the occupant of the subject vehicle 101 is urged to manually change the lane. Thereafter, the decision unit 302 switches the drive mode of the subject vehicle 101 to the manual drive mode before the subject vehicle 101 reaches the branch start position.

When the decision unit 302 decides the mode of lane change to be the automatic lane change mode, the recommendation unit 303 notifies the occupant of the subject vehicle 101 of recommendation information for recommending the occupant to change a lane via the input/output device 3. The recommendation information includes audio information and image information for notifying the occupant of the subject vehicle 101 that there is a branching road ahead in the traveling direction of the subject vehicle 101, that a lane change is started by performing a predetermined approval operation, or the like. The predetermined approval operation is, for example, an operation of pressing a predetermined switch or button provided on the steering wheel in a hands-on state. The hands-on state may be detected by a capacitance sensor provided in the steering wheel as a part of the internal sensor group 2, or may be detected by another method.

When the decision unit 302 decides the mode of lane change to be the normal lane change mode, the recommendation unit 303 sets the branch start position (the point P1 in FIG. 2A) as a reference position of the lane change control, and starts notification of recommendation information from a position away from the reference position by a predetermined distance (the predetermined distance D11 in FIG. 2A) toward the opposite side (backward) of the traveling direction. On the other hand, when the decision unit 302 decides the mode of lane change to be the specific lane change mode, the recommendation unit 303 sets the branch end position (the point P12 in FIG. 2B) as a reference position of the lane change control, and starts notification of recommendation information from a position away from the reference position by a predetermined distance (the predetermined distance D21 in FIG. 2B) (>the length of the adjacent section) toward the opposite side of the traveling direction. As described above, the normal lane change mode and the specific lane change mode are different in the reference position of the lane change control. The reception unit 304 receives an occupant's operation for approval (start instruction) from the occupant of the subject vehicle 101 in response to the recommendation of the lane change via the input/output device 3. The predetermined distance D11 and the predetermined distance D21 are set to have sufficient lengths in consideration of an approval limit position, which will be described below, so that the occupant of the subject vehicle 101 can perform an approval operation in good time.

When the reception unit 304 receives the approval operation, the generation unit 305 generates an action plan for lane change. When the decision unit 302 decides the mode of lane change to be the specific lane change mode, that is, when the branching road is a specific branching road, the generation unit 305 generates an action plan such that the lane change corresponding to the specific branching road is performed. For example, in the travel scene of FIG. 2B, when the subject vehicle 101 is traveling at a position before the specific branching road SR in the traveling direction, recommendation information is notified to the occupant of the subject vehicle 101 (t=t0), and when an approval operation from the occupant is received (t=t1), the generation unit 305 generates an action plan so that a lane change is started when the subject vehicle 101 reaches a position away from the point P11 by a predetermined distance (the predetermined distance D22 in FIG. 2B) ahead in the traveling direction (t=t2). In addition, the generation unit 305 generates the action plan so that the lane change from the current lane LN12 to the another lane LN13 is completed before the subject vehicle 101 reaches the point P12 (t=t3). In FIG. 2B, a driving path of the subject vehicle 101 from the time to to the time t3 is indicated by a broken line arrow. As described above, in the specific lane change mode, a lane change is not started immediately after the subject vehicle 101 passes the branch start position. As a result, it is possible to perform a smooth lane change without causing the occupant of the subject vehicle 101 to feel uncomfortable as described above. In addition, it is possible to reconfirm a road structure of the specific branching road, such as whether there is actually a branch end position in an adjacent lane ahead in the traveling direction, before a lane change is started. Furthermore, in a branching road having a long adjacent section such as a specific branching road, there may be a stopping vehicle or the like on a road shoulder of the adjacent section. By delaying a lane change start timing as described above, such a vehicle and the like can also be checked before the lane change is started. As a result, it is possible to improve traffic safety when a lane is changed on a specific branching road. On the other hand, when the decision unit 302 decides the mode of lane change to be the normal lane change mode, that is, when the branching road is a normal branching road, the generation unit 305 generates an action plan such that the lane change corresponding to the normal branching road is performed. More specifically, the generation unit 305 generates an action plan such that the lane change is started immediately after the subject vehicle 101 passes the branch start position (the point P1 in FIG. 2A).

In addition, even though the decision unit 302 decides the mode of lane change to be the automatic lane change mode, the generation unit 305 generates an action plan so that the subject vehicle 101 continues to travel in the current lane LN12 when the reception unit 304 does not receive an approval operation before the subject vehicle 101 reaches the approval limit position. The actuator control unit 401 controls the actuators AC based on the action plan. As a result, the subject vehicle 101 continues to travel in the current travel lane in the self-drive mode. The approval limit position is set to the branch start position (the point P1 in FIG. 2A) in the normal lane change mode, and is set to the position away from and before the branch end position (the point P12 in FIG. 2B) by a predetermined distance D23 in the specific lane change mode. The predetermined distance D23 is set in advance to a length enough to complete the lane change in good time before the subject vehicle 101 reaches the branch end position. When the traveling speed of the subject vehicle 101 at a recommendation start time (t=t0) is equal to or higher than a predetermined speed, the generation unit 305 may change the approval limit position according to the traveling speed of the subject vehicle 101. Specifically, the approval limit position may be set to a position farther away toward the opposite side of the traveling direction as the traveling speed of the subject vehicle 101 at the recommendation start time (t-t0) is higher. That is, the predetermined distance D23 may increase.

When the decision unit 302 decides the mode of lane change to be the manual lane change mode, the actuator control unit 401 controls the actuators AC in accordance with a driving operation of the occupant of the subject vehicle 101. As a result, the lane change is manually performed.

Figure 4:
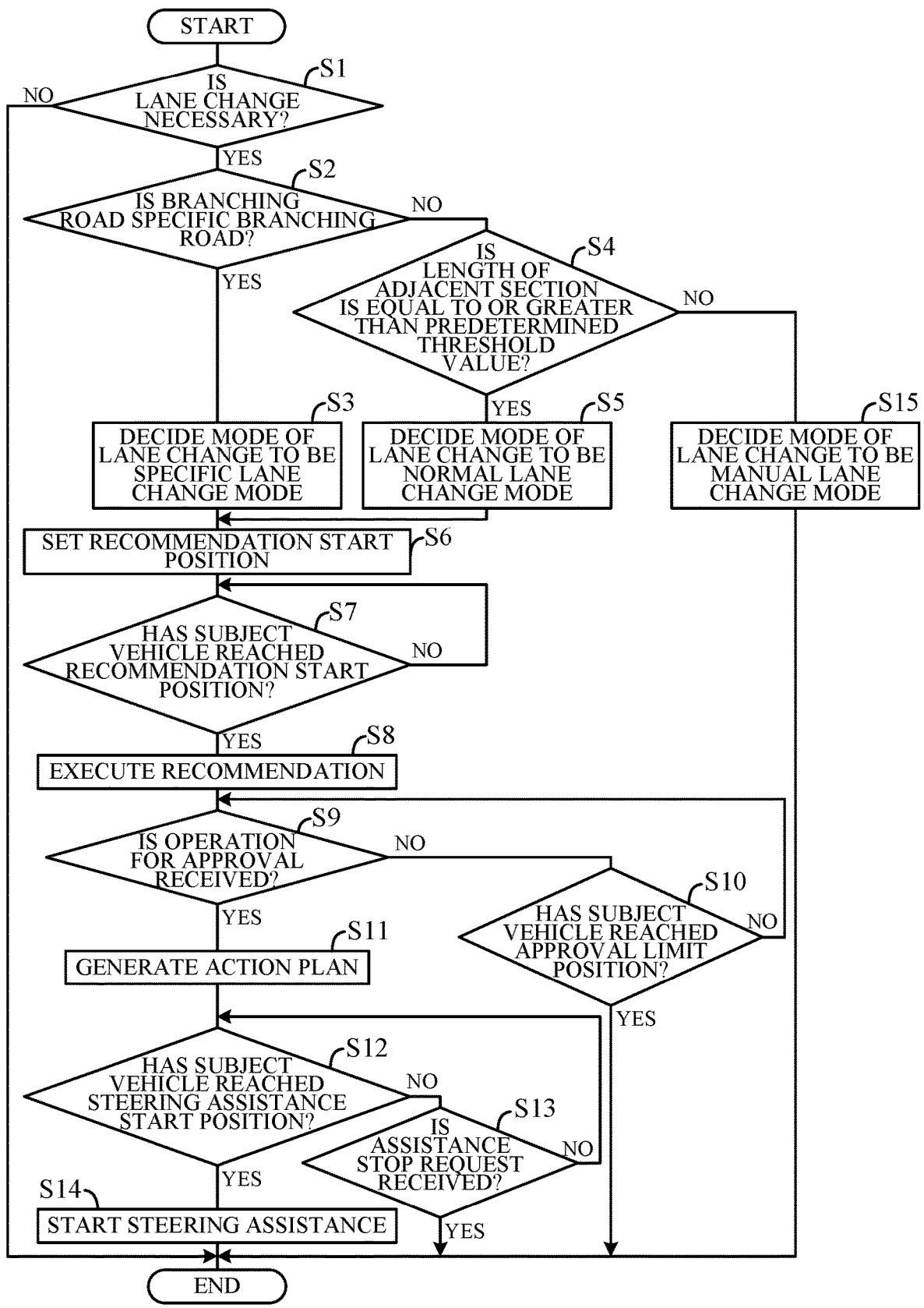
FIG. 4 is a flowchart illustrating an example of processing executed by the controller in FIG. 3.

FIG. 4 is a flowchart illustrating one example of processing executed by the controller 10 in FIG. 3 in accordance with a predetermined program. The processing illustrated in the flowchart of FIG. 4 is repeated, for example, at every predetermined cycle when the subject vehicle 101 travels in the self-drive mode.

First, in step S1, it is determined whether it is required to change a lane on a branching road based on a target route calculated by the navigation unit 6 and a subject vehicle position. If NO in step S1, the processing ends. If YES in step S1, it is determined in step S2 whether the branching road is a specific branching road, that is, whether the length of the adjacent section on the branching road is equal to or greater than a predetermined distance D10. If YES in step S2, that is, when the branching road is a specific branching road as illustrated in FIG. 2B, the mode of lane change is decided to be a specific lane change mode in step S3, and the processing proceeds to step S6. If No in step S2, it is determined in step S4 whether the length of the adjacent section on the branching road is equal to or greater than a predetermined threshold value DT. If YES in step S4, that is, when the branching road is a normal branching road as illustrated in FIG. 2A, the mode of lane change is decided to be a normal lane change mode in step S5, and the processing proceeds to step S6. If NO in step S4, it is determined that it is not possible to automatically change a lane, the mode of lane change is decided to be a manual lane change mode in step S15, and the processing ends.

In step S6, a recommendation start position is set. When the branching road is a normal branching road, the recommendation start position is set to a position away from a branch start position (the point P1 in FIG. 2A) by a predetermined distance D11 toward the opposite side of the traveling direction. On the other hand, when the branching road is a specific branching road, the recommendation start position is set to a position away from a branch end position (the point P12 in FIG. 2B) by a predetermined distance D21 toward the opposite side of the traveling direction. In step S7, it is determined whether the subject vehicle 101 has reached the recommendation start position. Step S7 is repeated until it is determined the subject vehicle 101 has reached the recommendation start position. If YES in step S7, the recommendation information is notified to the occupant via the input/output device 3 in step S8.

In step S9, it is determined whether an operation for approval (start instruction) from the occupant is received via the input/output device 3. If NO in step S9, it is determined in step S10 whether the subject vehicle 101 has reached the approval limit position. If NO in step S10, the processing returns to step S9. If YES in step S10, the processing ends. In this case, steering assistance is not performed, and the subject vehicle 101 continues to travel in the current travel lane in the self-drive mode. If YES in step S9, an action plan is generated in step S11.

In step S12, it is determined whether the subject vehicle 101 has reached a steering assistance start position indicated by the action plan. The steering assistance start position is set based on a traveling speed of the subject vehicle 101 and a length of the adjacent section such that a lane change of the subject vehicle 101 is completed at a position before the branch point. In the normal lane change mode, the steering assistance start position is set to the branch start position so that the subject vehicle 101 starts a lane change immediately after passing the branch start position (the point P1 in FIG. 2A) of the normal branching road. On the other hand, in the specific lane change mode, the steering assistance start position is set to a position away from the branch start position of the specific branching road (the point P11 in FIG. 2B) by a predetermined distance D22 ahead in the traveling direction. Even when an approval operation from the occupant is received at a position before the steering assistance start position, a lane change approving state is maintained until the subject vehicle 101 reaches the steering assistance start position, and the lane change is started when the subject vehicle 101 passes the steering assistance start position.

If NO in step S12, it is determined in step S13 whether a steering assistance cancelling operation (hereinafter referred to as the assistance stop request) is received via the input/output device 3. The assistance stop request may be made by an operation of pressing a predetermined switch or button provided on the steering wheel in the hands-on state, or may be made by another operation. If NO in step S13, the processing returns to step S12. If YES in step S13, the processing ends. In this case, steering assistance is not performed, and the subject vehicle 101 continues to travel in the current travel lane in the self-drive mode. If YES in step S12, steering assistance is started in step S14. More specifically, the actuators AC are controlled so that the subject vehicle 101 moves to a change destination lane according to the action plan generated in step S11.

According to the present embodiment, the following operational effects can be achieved.

(1) A vehicle control apparatus 50 includes: a determination unit 301 that acquires a target route of a subject vehicle 101 traveling in a self-drive mode from map information based on a current position and a destination of the subject vehicle 101, and determines based on the target route whether a lane change is necessary to change a traveling lane of the subject vehicle 101 from a first lane in which the subject vehicle 101 is currently traveling to a second lane; a decision unit 302 that decides a mode of the lane change; and a generation unit 305 that generates an action plan (first action plan) so that the subject vehicle 101 moves from the first lane to the second lane according to the mode of the lane change decided by the decision unit 302 when the determination unit 301 determines that the lane change is necessary. The target route includes a branching road in which the second lane is adjacent to the first lane from a first point to a second point ahead of the first point in a traveling direction and the second lane is separated from the first lane after the second point, and the decision unit 302 decides the mode of the lane change to be a first mode (normal lane change mode) or a second mode (specific lane change mode) that is different from the first mode in a reference position for determining a start position of control according to the lane change based on a length of a section from the first point to the second point. The decision unit 302 decides the mode of the lane change to be the first mode in which the reference position is the first point (the point P1 in FIG. 2A) when the section from the first point to the second point is smaller than a first predetermined distance (predetermined distance D10), and decides the mode of the lane change to be the second mode in which the reference position is the second point (the point P12 in FIG. 2B) when the section from the first point to the second point is equal to or greater than the first predetermined distance. Therefore, a lane change can be performed smoothly on a branching road. As a result, traffic safety on the branching road can be improved.

(2) The vehicle control apparatus 50 further includes an input/output device 3 that inputs and outputs information; a recommendation unit 303 that outputs, via the input/output device 3, recommendation information for recommending the lane change to an occupant of the subject vehicle 101 when the decision unit 302 decides the mode of the lane change to be the first mode or the second mode; a reception unit 304 that receives an approval operation for the recommendation of the lane change from the occupant of the subject vehicle 101 via the input/output device 3; and an actuator control unit 401 that controls actuators AC based on the action plan (first action plan) generated by the generation unit 305 when the reception unit 304 receives the approval operation. When the reception unit 304 receives the approval operation in a state where the decision unit 302 decides the mode of the lane change to be the second mode, the actuator control unit 401 controls the actuators AC so that the lane change is started when the subject vehicle 101 reaches a position ahead of the first point by a second predetermined distance (predetermined distance D22) based on the action plan (first action plan) generated by the generation unit 305. As a result, on the branching road as illustrated in FIG. 2B, it is possible to perform a smooth lane change without causing the occupant of the subject vehicle 101 to feel uncomfortable. When the decision unit 302 decides the mode of the lane change to be the second mode, the recommendation unit 303 outputs the recommendation information via the input/output device 3 when the subject vehicle reaches a position before the second point by a fourth predetermined distance (predetermined distance D21).

(3) Even though the decision unit 302 decides the mode of the lane change to be the second mode, the action plan (second action plan) is generated so that the subject vehicle 101 continues to travel in the first lane (the lane LN12 in FIG. 2B) when the reception unit 304 does not receive an approval operation before a distance between the subject vehicle 101 and the second point becomes smaller than a third predetermined distance (predetermined distance D23). The actuator control unit 401 controls the actuators AC based on the action plan (second action plan) generated by the generation unit 305. Even though the decision unit 302 decides the mode of the lane change to be the first mode, the action plan (second action plan) is generated so that the subject vehicle 101 continues to travel in the first lane (the lane LN2 in FIG. 2A) when the reception unit 304 does not receive an approval operation before the subject vehicle 101 reaches the first point (the point P1 in FIG. 2A). The actuator control unit 401 controls the actuators AC based on the action plan (second action plan) generated by the generation unit 305. By setting a limit position of approval for the recommendation information as described above, it is possible to prevent a lane change that cannot be completed before reaching a branch end position. The generation unit 305 increases the third predetermined distance as the traveling speed of the subject vehicle at the position before the second point by the fourth predetermined distance increases.

(4) When the length of the section from the first point to the second point is smaller than a predetermined threshold value DT, the decision unit 302 determines the mode of the lane change to be a third mode (manual lane change mode) in which a lane change is manually performed according to a driving operation of the occupant of the subject vehicle 101. Therefore, when the adjacent section does not have a sufficient length for automatically performing the lane change, the drive mode can be switched to the manual drive mode before the subject vehicle enters the branching road. As a result, traffic safety on the branching road can be further improved.

The above-described embodiment can be modified into various forms. Some modifications will be described below. In the above-described embodiment, the determination unit 301 determines whether a branching road is included in a target route calculated by the navigation unit 6. However, the determination unit may determine whether a branching road is included in a target route of the subject vehicle 101 based on a current position and a destination of the subject vehicle 101 by using map information stored in the map database 5 or the memory unit 12.

Further, in the above-described embodiment, the case where the lane change in the specific lane change mode is applied to the branching road as illustrated in FIG. 2B has been described as an example, but the lane change in the specific lane change mode can also be applied to a branch road other than that of FIG. 2B. For example, the lane change in the specific lane change mode can be similarly applied to a branching road on which a second lane is separated from a first lane to a first point, the second lane is adjacent to the first lane from the first point to a second point, and the second lane is separated from the first lane again after the second point.

In addition, in the above-described embodiment, the example in which the approval limit position or the like in the specific lane change mode is set to the branch end position (the point P12 in FIG. 2B) has been described. However, a steering assistance give-up position in the specific lane change mode may also be similarly set based on the branch end position. The give-up of the steering assistance is processing of canceling driving assistance when a state (standby state) in which a lane change cannot be started due to a road condition or the like of a destination lane continues although an approval operation for the lane change has been received. The give-up position is set to a position before the branch end position (the point P12 in FIG. 2B) by a predetermined distance (<the third predetermined distance). For example, in a case where there are a plurality of other vehicles in the lane LN13 of FIG. 2B, and there is a possibility that an inter-vehicle distance between the subject vehicle 101 and any of those other vehicles cannot be sufficiently secured when the subject vehicle 101 moves to the lane LN13, the subject vehicle 101 stands by to start the lane change. Thereafter, when the subject vehicle 101 in the stand-by state reaches the give-up position, the steering assistance is canceled. Similarly to the approval limit position, the steering assistance give-up position may be changed according to the traveling speed of the subject vehicle 101 when the traveling speed of the subject vehicle 101 at a recommendation start time (t=t0) is equal to or higher than a predetermined speed.

In addition, in the above-described embodiment, although the vehicle control system 100 is applied to a self-driving vehicle, the vehicle control system 100 is also applicable to a vehicle other than the self-driving vehicle. For example, the vehicle control system 100 can also be applied to a manually driven vehicle including advanced driver-assistance systems (ADAS).

The above embodiment can be combined as desired with one or more of the above modifications. The modifications can also be combined with one another.

According to the present invention, a lane change can be performed smoothly on a branching road.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus comprising:
an input/output device configured to input and output information; and
a microprocessor and a memory coupled to the microprocessor;
the microprocessor is configured to perform:
acquiring a target route of a subject vehicle traveling in a self-drive mode from map information based on a current position and a destination of the subject vehicle;
determining based on the target route whether a lane change is necessary to change a traveling lane of the subject vehicle from a first lane in which the subject vehicle is currently traveling to a second lane;
deciding a mode of the lane change;
generating an action plan so that the subject vehicle moves from the first lane to the second lane according to the mode of the lane change when it is determined that the lane change is necessary;
outputting via the input/output device recommendation information for recommending the lane change to an occupant of the subject vehicle when the mode of lane change is decided; and
controlling a traveling actuator based on the action plan, when receiving an approval operation in response to the recommendation of the lane change from the occupant via the input/output device, wherein
the target route includes a branching road in which the second lane is adjacent to the first lane from a first point to a second point ahead of the first point in a traveling direction and the second lane is separated from the first lane behind the second point, and the microprocessor is configured to perform:
the deciding including deciding, when a section from the first point to the second point is smaller than a first predetermined distance, the mode of the lane change to be a first mode in which the lane change is started when the subject vehicle reaches the first point, and deciding, when the section is equal to or greater than the first predetermined distance, the mode of the lane change to be the second mode in which the lane change is started when the subject vehicle reaches a position ahead of the first point by a second predetermined distance; and
the generating including, even though the mode of the lane change is decided to be the second mode, generating the action plan so that the subject vehicle continues to travel in the first lane when the approval operation is not received before the subject vehicle reaches an approval limit position set ahead of the first point and before the second point in the traveling direction.

2. The vehicle control apparatus according to claim 1, wherein
the microprocessor is configured to perform:
the controlling including, when the approval operation is received in a state where it is decided the mode of the lane change to be the second mode in the deciding, controlling the traveling actuator so that the lane change is started when the subject vehicle reaches a position ahead of the first point by the second predetermined distance based on the action plan.

3. The vehicle control apparatus according to claim 1, wherein
the action plan is a first action plan, and
the microprocessor is configured to perform:
the generating including, even though the mode of the lane change is decided to be the second mode, generating a second action plan so that the subject vehicle continues to travel in the first lane when the approval operation is not received before a distance between the subject vehicle and the second point becomes smaller than a third predetermined distance; and
the controlling including controlling the traveling actuator based on the second action plan.

4. The vehicle control apparatus according to claim 3, wherein
the microprocessor is configured to perform:
the outputting including, when the mode of the lane change is decided to be the second mode, outputting via the input/output device the recommendation information when the subject vehicle reaches a recommended start position set ahead of the first point; and
the generating including increasing a distance between the recommended start position and the second point as a traveling speed of the subject vehicle at the recommended start position increases.

5. The vehicle control apparatus according to claim 4, wherein
the microprocessor is configured to perform:
the generating including, even though the mode of the lane change is decided to be the first mode, generating the second action plan so that the subject vehicle continues to travel in the first lane when the approval operation is not received before the subject vehicle reaches the first point; and
the controlling including controlling the traveling actuator based on the second action plan.

6. The vehicle control apparatus according to claim 4, wherein the microprocessor is configured to perform:

the deciding including deciding the mode of the lane change to be a third mode in which the lane change is manually performed according to a driving operation of the occupant when the length of the section from the first point to the second point is smaller than a predetermined threshold; and the predetermined threshold is smaller than the first predetermined distance.

7. A vehicle control apparatus comprising:

an input/output device configured to input and output information; and a microprocessor and a memory coupled to the microprocessor;

the microprocessor is configured to function as:

a determination unit configured to acquire a target route of a subject vehicle traveling in a self-drive mode from map information based on a current position and a destination of the subject vehicle to determine based on the target route whether a lane change is necessary to change a traveling lane of the subject vehicle from a first lane in which the subject vehicle is currently traveling to a second lane;

a decision unit configured to decide a mode of the lane change;

a generation unit configured to generate an action plan so that the subject vehicle moves from the first lane to the second lane according to the mode of the lane change decided by the decision unit when it is determined that the lane change is necessary by the determination unit;

a recommendation unit configured to output via the input/output device recommendation information for recommending the lane change to an occupant of the subject vehicle when the mode of lane change is decided; and an actuator control unit configured to control a traveling actuator based on the action plan, when receiving an approval operation in response to the recommendation of the lane change from the occupant via the input/output device, wherein the target route includes a branching road in which the second lane is adjacent to the first lane from a first point to a second point ahead of the first point in a traveling direction and the second lane is separated from the first lane behind the second point, and the decision unit is further configured to decide, when a section from the first point to the second point is smaller than a first predetermined distance, the mode of the lane change to be a first mode in which the lane change is started when the subject vehicle reaches the first point, and to decide, when the section is equal to or greater than the first predetermined distance, the mode of the lane change to be the second mode in which the lane change is started when the subject vehicle reaches a position ahead of the first point by a second predetermined distance; and the generation unit is further configured to generate, even though the mode of the lane change is decided to be the second mode, the action plan so that the subject vehicle continues to travel in the first lane when the approval operation is not received before the subject vehicle reaches an approval limit position set ahead of the first point and before the second point in the traveling direction.

8. The vehicle control apparatus according to claim 7, wherein when the approval operation is received by the reception unit in a state where it is decided the mode of the lane change to be the second mode by the decision unit, the actuator control unit is further configured to control the traveling actuator so that the lane change is started when the subject vehicle reaches a position ahead of the first point by the second predetermined distance based on the action plan generated by the generation unit.

9. The vehicle control apparatus according to claim 7, wherein the action plan is a first action plan, even though the mode of the lane change is decided to be the second mode by the decision unit, the generation unit is further configured to generate a second action plan so that the subject vehicle continues to travel in the first lane when the approval operation is not received by the reception unit before a distance between the subject vehicle and the second point becomes smaller than a third predetermined distance, and the actuator control unit is further configured to control the traveling actuator based on the second action plan generated by the generation unit.

10. The vehicle control apparatus according to claim 9, wherein when the mode of the lane change is decided to be the second mode by the decision unit, the recommendation unit is further configured to output via the input/output device the recommendation information when the subject vehicle reaches a recommended start position set ahead of the first point, and the generation unit is further configured to increase a increases the third predetermined distance between the recommended start position and the second point as a traveling speed of the subject vehicle at the recommended start position increases.

11. The vehicle control apparatus according to claim 10, wherein even though the mode of the lane change is decided to be the first mode by the decision unit, the generation unit is further configured to generate the second action plan so that the subject vehicle continues to travel in the first lane when the approval operation is not received by the reception unit before the subject vehicle reaches the first point, and the actuator control unit is further configured to control the traveling actuator based on the second action plan generated by the generation unit.

12. The vehicle control apparatus according to claim 10, wherein the decision unit is further configured to decide the mode of the lane change to be a third mode in which the lane change is manually performed according to a driving operation of the occupant when the length of the section from the first point to the second point is smaller than a predetermined threshold, and the predetermined threshold is smaller than the first predetermined distance.

13. The vehicle control apparatus according to claim 1, wherein a position at which the subject vehicle starts the lane change in the second mode, located at the second predetermined distance ahead of the first point, is set before the approval limit position in the traveling direction.

* * * * *